(12) United States Patent
Dworak et al.

(10) Patent No.: US 6,406,753 B2
(45) Date of Patent: Jun. 18, 2002

(54) AQUEOUS COATING COMPOSITION

(75) Inventors: Gert Dworak, Graz; Ulrike Kuttler, Vasoldsberg, both of (AT)

(73) Assignee: Solutia Austria AG (AT)

( * ) Notice: Subject to any disclaimer, the term of this patent is extended or adjusted under 35 U.S.C. 154(b) by 4 days.

(21) Appl. No.: 09/727,136

(22) Filed: Nov. 30, 2000

(30) Foreign Application Priority Data

Dec. 23, 1999 (AT) .............................................. 2173/99

(51) Int. Cl.$^7$ ................................................. B05D 3/02
(52) U.S. Cl. ...................... 427/379; 523/404; 525/165; 525/172; 525/418; 525/419; 528/271; 528/297; 528/405; 528/421
(58) Field of Search ................................ 427/379, 386, 427/388.2, 388.4; 523/404; 525/165, 172, 418, 419; 528/271, 297, 405, 421

(56) References Cited

U.S. PATENT DOCUMENTS

| 3,124,605 A | 3/1964 | Wagner |
| 3,358,010 A | 12/1967 | Britain |
| 3,903,126 A | 9/1975 | Woerner et al. |
| 3,903,127 A | 9/1975 | Wagner et al. |
| 3,976,622 A | 8/1976 | Wagner et al. |
| 4,210,702 A * | 7/1980 | Dalibor .................. 428/413 |
| 4,324,879 A | 4/1982 | Bock et al. |
| 4,331,573 A | 5/1982 | Zabrocki et al. |
| 5,521,247 A | 5/1996 | Dobler et al. |

FOREIGN PATENT DOCUMENTS

WO    WO 93/01245    1/1993

* cited by examiner

*Primary Examiner*—Robert Dawson
*Assistant Examiner*—D. Aylward
(74) *Attorney, Agent, or Firm*—ProPat, L.L.C.

(57) ABSTRACT

Coating composition especially for preparing automotive surfacers, comprising an anionically stabilized resin, preferably a condensation product A of a carboxyl group-containing resin A1 and a hydroxyl group-containing resin A2, and a curing agent C, which becomes active even at room temperature or slightly elevated temperature of up to not more than 120° C., and comprises a mixture of an unblocked isocyanate C1 and a hydrophilic partially etherified amino resin C2.

11 Claims, No Drawings

AQUEOUS COATING COMPOSITION

BACKGROUND OF THE INVENTION

1. Field of the Invention

The invention relates to an aqueous coating composition suitable in particular for producing coatings on automobile parts. The parts thus coated, especially those where the coating composition described here is used as surfacer coat, are notable for high hardness and freedom from defects of the coating film and for high stone-chip resistance.

2. Description of the Related Art

EP-A 0 594 685 relates to the use of condensation products of carboxyl group-containing polyurethane resins and hydroxyl group-containing polyester resins, with or without urethane modification, together with water-insoluble blocked isocyanates for producing stoving enamels. An improvement of this formulation with reduced sensitivity to so-called overbaking is known from EP-A 0 548 873, the improvement being achieved by adding a water-soluble amine resin as crosslinker.

All of these known systems must be cured by heating to temperatures at which either the blocked isocyanate curing agent is at least partly deblocked and so becomes active or the amino resin curing agents exhibit sufficient (crosslinking) reactivity. The object was therefore to provide aqueous coating compositions which are suitable, inter alia, for producing surfacer coats in automotive finishing and which cure even at room temperature or only slightly elevated temperature (up to 120° C., preferably up to 100° C., and in particular up to not more than 90° C.) to give paint films having properties at least equal to those of the prior art.

SUMMARY OF THE INVENTION

It has now been found that by using a combination of water-insoluble unblocked isocyanates and water-soluble or water-dispersible, partly etherified amino resins as curing agents together with anionically stabilized, hydroxyl group-containing resins, especially condensation products of hydroxyl group-containing and carboxyl group-containing resins, it is possible to obtain coating compositions which, compared to the known systems, exhibit, after curing, defect-free films, a higher film hardness and good stone-chip resistance even at low temperatures.

The invention therefore provides a coating composition comprising an anionically stabilized, hydroxyl group-containing resin A, and a curing agent C comprising a water-insoluble unblocked isocyanate C1 and a hydrophilic partly etherified amino resin C2.

The term "anionically stabilized" here is intended to denote that the resin in question has acid groups in an amount sufficient such that, with at least partial neutralization of the acid groups by addition of alkali in a mixture with water, a solution (single-phase mixture) or a dispersion (multiphase mixture) is formed which does not undergo separation spontaneously or on storage at room temperature for at least 7 days.

"Water-insoluble" is a term used to refer to those compounds for which, following the achievement of equilibrium at 20° C. with an amount of water the mass of which is ten times that of the compound in question, less than 5% of the mass of the compound that is used is present in solution in the aqueous phase.

Further objects, features and advantages of the invention will become apparent from the detailed description of the preferred embodiments that follows.

DETAILED DESCRIPTION OF THE PREFERRED EMBODIMENTS

Preferably, the anionically stabilized, hydroxyl group-containing resin A is a condensation product Ak of a resin A1 containing acid groups and a resin A2 containing hydroxyl groups, A1 preferably having an acid number of from 100 to 230 mg/g, in particular from 120 to 160 mg/g, and A2 preferably having a hydroxyl number of from 50 to 500 mg/g, in particular from 60 to 350 mg/g.

The acid number is defined in accordance with DIN 53 402 as the ratio of the mass $m_{KOH}$ of potassium hydroxide required to neutralize the sample under analysis to the mass $m_B$ of this sample (mass of the solids in the sample in the case of solutions or dispersions); its customary unit is "mg/g". The hydroxyl number is defined in accordance with DIN 53 240 as the ratio of that mass $m_{KOH}$ of potassium hydroxide which has exactly the same number of hydroxyl groups as the sample under analysis to the mass $m_B$ of this sample (mass of the solids in the sample in the case of solutions or dispersions); its customary unit is "mg/g".

The condensation product Ak preferably has an acid number of from 25 to 75 mg/g, in particular from 30 to 50 mg/g. Its Staudinger Index ("limiting viscosity number") is usually from 10 to 20 $cm^3/g$, in particular from 12 to 19 $cm^3/g$, and with particular preference from 13 to 18 $cm^3/g$. It is prepared using components A1 and A2 preferably in a mass ratio of from 10:90 to 80:20, in particular from 15:85 to 40:60.

The formerly so-called "limiting viscosity number", called "Staudinger Index" $J_g$ in accordance with DIN 1342, Part 2.4, is the limiting value of the Staudinger function $J_v$ at decreasing concentration and shear stress, $J_v$ being the relative change in viscosity based on the mass concentration $\beta_B = m_B/V$ of the dissolved substance B (with the mass $m_B$ of the substance in the volume V of the solution); i.e., $J_v = (\eta_r - 1)/\beta_B$. Here, $\eta_r - 1$ is the relative change in viscosity, in accordance with $\eta_r - 1 = (\eta - \eta_s)/\eta_s$. The relative viscosity $\eta_r$ is the ratio of the viscosity $\eta$ of the solution under analysis and the viscosity $\eta_s$ of the pure solvent. (The physical definition of the Staudinger Index is that of a specific hydrodynamic volume of the solvated polymer coil at infinite dilution and in the state of rest.) The unit commonly used for J is "$cm^3/g$"; formerly often "dl/g".

The resins A1 containing carboxyl groups are preferably selected from polyester resins A11, polyurethane resins A12, the so-called maleate oils A13, the graft products A14 of fatty acids and fatty acid mixtures grafted with unsaturated carboxylic acids, and the acrylate resins A15. Instead of or in a mixture with resins containing carboxyl groups, it is also possible to use epoxy resins modified with phosphoric acid and/or phosphonic acids, or similarly modified reaction products of epoxy resins with fatty acids, referred to comprehensively as A16.

Preferably, the acid number of the resins A1 is from 100 to 230 mg/g, in particular from 70 to 160 mg/g. Its Staudinger Index, measured in dimethylformamide as solvent at 20° C., is generally from about 6.5 to 12 $cm^3/g$, preferably from 8 to 11 $cm^3/g$.

Suitable polyester resins A11 may be prepared in a conventional manner from polyols A111 and polycarboxylic acids A112, where also some—preferably up to 25% of the amount of substance—of the polyols and polycarboxylic acids can be replaced by hydroxycarboxylic acids A113. By appropriate choice of the nature and amount of the starting materials A111 and A112 it is ensured that the resulting polyester has a sufficient number of acid groups, in accordance with the acid number indicated above. The polyols A111 are preferably selected from aliphatic and cycloaliphatic alcohols having 2 to 10 carbon atoms and on average at least two hydroxyl groups per molecule; glycol, 1,2- and 1,3-propanediol, 1,4-butanediol, 1,6-hexanediol, neopentyl glycol, di- and triethylene glycol, di- and tripropylene glycol, glycerol, trimethylolpropane and trimethylolethane are particularly suitable. Suitable polycarboxylic acids A112 are aliphatic, cycloaliphatic and aromatic polycarboxylic acids such as adipic acid, succinic acid, cyclohexanedicarboxylic acid, phthalic acid, isophthalic and terephthalic acids, trimellitic acid, trimesic acid and benzophenonetetracarboxylic acid. It is also possible to use compounds having both carboxylic acid groups and sulfonic acid groups, such as sulfoisophthalic acid, for example.

Suitable polyurethane resins A12 may be prepared by reacting aliphatic polyols A121, as defined under A111, hydroxyalkanecarboxylic acids A122 having at least one, preferably two, hydroxyl groups and a carboxyl group which under esterification conditions is less reactive than those of adipic acid; preference is given to the use of dihydroxy-monocarboxylic acids selected from dimethylolacetic acid, dimethylolbutyric acid and dimethylolpropionic acid; oligomeric or polymeric compounds A125 having on average at least two hydroxyl groups per molecule, which may be selected from polyether polyols A1251, polyester polyols A1252, polycarbonate polyols A1253, saturated and unsaturated dihydroxy-aliphatic compounds A1254, which are obtainable by oligomerizing or polymerizing dienes having 4 to 12 carbon atoms, especially butadiene, isoprene and dimethylbutadiene, followed by functionalization in a known manner, and also polyfunctional isocyanates A123, selected preferably from aromatic, cycloaliphatic and also linear and branched aliphatic difunctional isocyanates such as tolylene diisocyanate, bis(4-isocyanatophenyl)methane, tetramethylxylylene diisocyanate, isophorone diisocyanate, bis(4-isocyanatocyclohexyl)methane, hexamethylene diisocyanate and 1,6-diisocyanato-3,3,5- and -3,5,5-trimethylhexane.

Particular preference is given to those polyurethane resins A12 which are prepared by reacting a mixture of one or more polyols A121 with a hydroxyalkanecarboxylic acid A122 and at least one polyfunctional isocyanate A123 which has been at least partly blocked, usually to the extent of more than 20%, preferably to the extent of more than 35% and, in particular, to the extent of 50% or more with monohydroxy compounds A124 selected from polyalkylene glycol monoalkyl ethers HO—($R^1$—O)$_n$—$R^2$, where $R^1$ is a linear or branched alkylene radical having 2 to 6, preferably 2 to 4 carbon atoms and $R^2$ is an alkyl group of from 1 to 8, preferably 2 to 6 carbon atoms and oximes of aliphatic ketones having 3 to 9 carbon atoms. The degree of blocking is stated here as the fraction of the blocked isocyanate groups, based on the total isocyanate groups present (blocked and unblocked) in the isocycanate A123. It is further preferred to prepare the polyurethane resins A12 by reacting a mixture of a polyfunctional isocyanate and a polyfunctional isocyanate blocked as described above with the hydroxyalkanecarboxylic acid A122 and the polyols A121 and A125, the proportions in the mixture being chosen so that each molecule of the polyurethane A12 contains on average one or more than one terminal blocked isocyanate group.

"Maleate oil" A13 is a term used to denote reaction products of (drying) oils A131 and olefinically unsaturated carboxylic acids A132, especially dicarboxylic acids. Oils used as A131 are preferably drying and semidrying oils such as linseed oil, tallow oil, rapeseed oil, sunflower oil and cottonseed oil, having iodine numbers of from about 100 to about 180. The unsaturated carboxylic acids A132 are selected so that under the customary conditions they graft under free-radical conditions (following addition of initiators or following heating) onto the initial charge of oils with a yield (fraction of the unsaturated carboxylic acids bonded to the oil after reaction, based on the amount used for the reaction) of more than 50%. Particularly suitable is maleic acid in the form of its anhydride, as are tetrahydrophthalic anhydride, acrylic and methacrylic acid, and also citraconic, mesaconic and itaconic acid.

Other suitable resins A14 are the graft products of fatty acids or fatty acid mixtures A141 grafted with the unsaturated acids specified under A132, said fatty acids or fatty acid mixtures A141 being obtainable in industrial amounts by saponification of fats. The appropriate fatty acids have at least one olefinic double bond in the molecule; those which may be listed by way of example include oleic acid, linoleic and linolenic acid, ricinoleic acid and elaidic acid, and also the stated technical-grade mixtures of such acids.

Further suitable resins A15 are the acidic acrylate resins obtainable by copolymerization of olefinically unsaturated carboxylic acids A151 and other vinyl or acrylic monomers A152. The carboxylic acids are those already mentioned under A132, and also vinylacetic acid and crotonic and isocrotonic acid and the monoesters of olefinically unsaturated dicarboxylic acids, such as monomethyl maleate and monomethyl fumarate, for example. Suitable monomers A152 are the alkyl esters of acrylic and methacrylic acid having preferably from 1 to 8 carbon atoms in the alkyl group, (meth)acrylonitrile, hydroxyalkyl (meth)acrylates having 2 to 6 carbon atoms in the alkyl group, styrene, vinyltoluene, and vinyl esters of aliphatic linear and branched carboxylic acids having 2 to 15 carbon atoms, especially vinyl acetate and the vinyl ester of a mixture of branched aliphatic carboxylic acids having on average 9 to 11 carbon atoms. It is also advantageous to copolymerize the monomers specified under A151 and A152 in the presence of compounds A153 which react with the unsaturated carboxylic acids with addition and formation of a carboxyl- or hydroxyl-functional, copolymerizable compound. Examples of such compounds are lactones A1531, which react with the carboxylic acids A151 with ring opening to form a carboxyl-functional unsaturated compound, and epoxides A1532, especially glycidyl esters of α-branched saturated aliphatic acids having 5 to 12 carbon atoms, such as of neodecanoic acid or neopentanoic acid, which react with the acid A151 in an addition reaction to give a copolymerizable compound containing a hydroxyl group. The amounts of substance of the compounds used should be such that the required acid number is reached. If this compound A153 is introduced as the initial charge and the polymerization is conducted so that this compound is used as (sole) solvent, solvent-free acrylate resins are obtained.

The epoxy resins modified with phosphoric acid or phosphonic acids or the adducts of epoxy resins and fatty acids, modified in the same way, referred to comprehensively as A16, are prepared by reacting phosphoric acid or organic phosphonic acids which are at least dibasic with epoxy resins or adducts of epoxy resins and fatty acids, preferably in a solvent. The amount of substance of the phosphoric or phosphonic acid used is normally such that all of the epoxide groups are consumed by the reaction with the acid and such that a sufficient number of acid groups is still available even after the reaction. The resulting resin has hydroxyl groups (from the reaction of the oxirane group with the acid function), these hydroxyl groups being positioned β to the ester group, possibly hydroxyl groups in the glycidyl alcohol residues which are bonded by ether links in the epoxy resin, and also acid groups of the phosphoric or phosphonic acid which were not consumed by the reaction with the epoxide.

Suitable hydroxyl group-containing resins A2 are, in particular, polyesters A21, acrylate resins A22, polyurethane resins A23, and epoxy resins A24. The hydroxyl number of the resins A2 is generally from about 50 to 500 mg/g, preferably from about 60 to 350 mg/g, and with particular preference from 70 to 300 mg/g. Their Staudinger Index, measured at 20° C. in dimethylformamide as solvent, is preferably from 8 to 13 cm$^3$/g, in particular from 9.5 to 12 cm$^3$/g.

The polyesters A21 are prepared like the component A11 by polycondensation; in this case all that is necessary is to select the nature and amount of the starting materials such that there is an excess of hydroxyl groups over the acid groups to arrive at the hydroxyl number for the condensation products indicated above. This can be achieved by using polyhydric alcohols containing on average at least two, preferably at least 2.1, hydroxyl groups per molecule, with dicarboxylic acids or with a mixture of poly- and monocarboxylic acids containing on average not more than two, preferably from 1.5 to 1.95, acid groups per molecule. Another possibility is to use a corresponding excess of hydroxyl components (polyols) A211 over the acids A212. The polyols A211 and the polyfunctional acids A212 which are reacted in the polycondensation reaction to give the hydroxyl group-containing polyesters A21 are selected from the same groups as the polyols A111 and the acids A112. It is likewise possible here to replace some of the polyols and acids by hydroxy acids in accordance with A113. The aim is for the acid number of component A2 not to exceed 20 mg/g and to be preferably below 18 mg/g. The acid number may be reduced, for example, by reacting the condensed polyester A21 with a small amount of monofunctional aliphatic alcohols A114 with from 4 to 20 carbon atoms under esterification conditions. The amount of alcohols A114 is such that, although the acid number is reduced below the limit, the Staudinger Index does not fall below the stated lower limit. Examples of suitable aliphatic alcohols are n-hexanol, 2-ethylhexanol, isodecyl alcohol and tridecyl alcohol.

The hydroxyl group-containing acrylate resins A22 are obtainable by usually free-radically initiated copolymerization of hydroxyl group-containing acrylic monomers A221 with other vinyl or acrylic monomers A222 without such functionality. Examples of the monomers A221 are esters of acrylic and methacrylic acid with aliphatic polyols, especially diols having 2 to 10 carbon atoms, such as hydroxyethyl and hydroxypropyl (meth)acrylate. Examples of the monomers A222 are the alkyl esters of (meth)acrylic acid having 1 to 10 carbon atoms in the alkyl group such as methyl, ethyl, n-butyl and 2-ethylhexyl (meth)acrylate, (meth)acrylonitrile, styrene, vinyltoluene, vinyl esters of aliphatic monocarboxylic acids having 1 to 10 carbon atoms such as vinyl acetate and vinyl propionate. Preference is also given to those acrylate resins prepared not, as is usual, in solution but instead in a bulk polymerization in which the initial charge comprises a liquid cyclic compound which acts as solvent during the polymerization reaction and which by means of ring opening forms a copolymerizable compound on reaction with one of the monomers used. Examples of such compounds are glycidyl esters of α-branched aliphatic monocarboxylic acids, especially the acids or acid mixtures available commercially as neopentanoic acid or neodecanoic acid, and also lactones such as ε-caprolactone or δ-valerolactone. If these glycidyl esters are used, then during the polymerization it is necessary to use comonomers containing acid groups, such as (meth)acrylic acid, in an amount which is at least equimolar to the amount of substance of the epoxide groups. The lactones may be used, with ring opening, both with hydroxyl group-containing comonomers and with comonomers containing acid groups.

Hydroxyl group-containing polyurethane resins A23 are obtainable in a known manner by addition reaction of oligomeric or polymeric polyols A231 selected from polyester polyols, polyether polyols, polycarbonate polyols and polyolefin polyols, and, if desired, low molar mass aliphatic diols or polyols A233 having 2 to 12 carbon atoms, such as ethylene glycol, 1,2- and 1,3-propylene glycol, 1,4-butanediol, 1,6-hexanediol, di- and triethylene and/or -propylene glycol, neopentyl glycol, trimethylolpropane, pentaerythritol, ditrimethylolpropane, and dipentaerythritol, and polyfunctional isocyanates A232, the latter being used in a substoichiometric amount such that the number of hydroxyl groups in the reaction mixture is greater than the number of isocyanate groups. Suitable polyols are, in particular, oligomeric and polymeric dihydroxy compounds having a number-average molar mass $M_n$ of from about 200 to 10,000 g/mol. By means of polyaddition with polyfunctional, especially difunctional, isocyanates, the molecules are enlarged up to the target value for the Staudinger index of at least 8 cm$^3$/g, preferably at least 9.5 cm$^3$/g.

Epoxy resins A24 obtainable by reacting epichlorohydrin with aliphatic or aromatic diols or polyols, especially bisphenol A, bisphenol F, resorcinol, novolaks or oligomeric polyoxyalkylene glycols having 2 to 4, preferably 3 carbon atoms in the alkylene group, have at least one hydroxyl group per epichlorohydrin molecule used. Instead of the reaction of epichlorohydrin with diols, it is also possible to prepare the appropriate epoxy resins by the so-called advancement reaction from diglycidyl ethers of diols (such as those mentioned above) or diglycidyl esters of dibasic organic acids with the stated diols. All known epoxy resins may be used here, provided they satisfy the condition for the hydroxyl number.

As anionically stabilized resins A it is also possible to use polyesters Ap which may be prepared in a known manner by condensing polyfunctional acids and polyfunctional compounds containing hydroxyl groups. The excess of acid groups needed for anionic stabilization may be achieved by using either acids or hydroxyl group-containing compounds having a functionality of more than 2, the amounts of the components being chosen such that the amount of substance of the acid groups exceeds that of the hydroxyl groups to the desired extent, or by using hydroxyl group-containing compounds which in addition carry acid groups whose participation in the polycondensation reaction is zero or only minimal (not more than 20% of the acid groups are esterified under the condensation conditions). These polyesters Ap also preferably have an acid number of from about 10 to 60 mg/g, more preferably from 15 to 55 mg/g, and in particular from 20 to 50 mg/g. The amount of hydroxyl groups in Ap corresponds to a hydroxyl number of at least 10 mg/g, preferably from 15 to 200 mg/g, and in particular from 25 to 150 mg/g. The polyester Ap usually has a Staudinger index $J_0$ of from 5 to 25 cm$^3$/g, preferably from 7 to 22 cm$^3$/g, and in particular from 10 to 20 cm$^3$/g, measured in dimethylformamide at 20° C.

Further anionically stabilized resins Ae which may be used for the invention are the epoxy resins modified with phosphoric acid or phosphonic acids, or adducts of epoxy resins and fatty acids modified with phosphoric acid or phosphonic acids, as already mentioned above in connection with A16. They are prepared by reacting phosphoric acid or organic phosphonic acids which are at least dibasic with epoxy resins or adducts of epoxy resins and fatty acids, preferably in a solvent. The amount of substance of the phosphoric or phosphonic acid used is usually such that all of the epoxide groups are consumed by reaction with the acid and such that a sufficient number of acid groups is available even after the reaction. The resulting resin has hydroxyl groups (from the reaction of the oxirane group with the acid function), these hydroxyl groups being positioned β to the ester group, and also acid groups of the phosphoric or phosphonic acid which were not consumed by the reaction with the epoxide. In this case as well, the target acid number is from about 10 to 60 mg/g, preferably from 15 to 55 mg/g, and in particular from 20 to 50 mg/g. The amount of hydroxyl groups in Ae corresponds to a hydroxyl number of at least 10 mg/g, preferably from 15 to 200 mg/g, and in particular from 25 to 150 mg/g.

The curing agents C comprise a combination of water-insoluble unblocked isocyanates C1 and highly reactive partially etherified amino resins C2. The mass fractions of the curing components C1 and C2 (mass of the individual component C1, and C2, respectively, divided by the total mass of the curing agents used) are preferably from 65 to 95% of component C1 and from 35 to 5% of component C2, with the sum of the mass fractions necessarily being 100%, of course.

The unblocked isocyanates C1 are any desired organic polyfunctional isocyanates which are liquid at room temperature and have free isocyanate groups attached to aliphatic, cycloaliphatic, araliphatic and/or aromatic moieties. The isocyanate component C1 generally has a viscosity of from 50 to 20,000 mPa·s at 23° C. With particular preference, the isocyanate component C1 comprises polyfunctional isocyanates or mixtures of such isocyanates with isocyanate groups attached exclusively to aliphatic and/or cycloaliphatic moieties and having an (average) NCO functionality of between 2.0 and 5.0.

If necessary, the isocyanates may be used as a blend with small amounts of inert solvents in order to reduce the viscosity to a level within the stated ranges. The amount of such solvents, however, is generally such that in the coating materials of the invention obtained ultimately the mass fraction of solvents does not exceed 30%, calculated to include any solvents still present in the polymer dispersions or polymer solutions. Examples of solvents suitable as additives for the polyisocyanates are aromatic hydrocarbon mixtures such as solvent naphtha.

Isocyanates suitable as component C1 are, in particular, diisocyanates or, preferably, the so-called paint polyisocyanates having isocyanate groups attached to aromatic or (cyclo)aliphatic moieties, particular preference being given to the last-mentioned aliphatic isocyanates.

The diisocyanates comprise the compounds known in the fields of polyurethanes and paints, such as aliphatic, cycloaliphatic or aromatic diisocyanates. They preferably possess the formula Q(NCO)$_2$, where Q is a hydrocarbon radical having 4 to 40 carbon atoms, especially 4 to 20 carbon atoms, and preferably an aliphatic hydrocarbon radical having 4 to 12 carbon atoms, a cycloaliphatic hydrocarbon radical having 6 to 15 carbon atoms, an aromatic hydrocarbon radical, having 6 to 15 carbon atoms, or an araliphatic hydrocarbon radical having 7 to 15 carbon atoms. Examples of such diisocyanates to be used with preference are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 2,2-bis(4,4'-diisocyanatodicyclohexyl)propane, 1,4-diisocyanatobenzene, 2,4- or 2,6-diisocyanatotoluene and/or mixtures of these isomers, 4,4'- or 2,4'-diisocyanatodiphenylmethane, 2,2-bis(4,4'-diisocyanatodiphenyl)propane, p-xylylene diisocyanate and α,α,α',α'-tetramethyl-m- or -p-xylylene diisocyanate, and mixtures of these compounds.

Suitable polyisocyanates, in addition to these simple ones, include those containing heteroatoms in the radical linking the isocyanate groups. Examples of such polyisocyanates are those containing carbodiimide groups, allophanate groups, isocyanurate groups, urethane groups, acylated urea groups, or biuret groups. For further suitable polyfunctional isocyanates, reference may be made, for example, to DE-A 29 28 552.

Highly suitable polyisocyanates are, for example, "paint polyisocyanates" based on hexamethylene diisocyanate or on 1-isocyanato-3,3,5-trimethyl-4-isocyanatomethylcyclohexane (IPDI) and/or bis (isocyanatocyclohexyl)methane, especially those based exclusively on hexamethylene diisocyanate. By "paint polyisocyanates" based on these diisocyanates are meant the conventional derivatives of these diisocyanates containing biuret, urethane, uretdione and/or isocyanurate groups which following their preparation have if necessary been freed in a known manner, preferably by distillation, from excess starting diisocyanate down to a residual mass fraction of less than 0.5%. The preferred aliphatic polyfunctional isocyanates for use in accordance with the invention include the polyfunctional isocyanates based on hexamethylene diisocyanate, containing biuret groups and conforming to the abovementioned criteria, as may be obtained, for example, by the processes of U.S. Pat. Nos. 3,124,605, 3,358,010, 3,903,126, 3,903,127 or 3,976,622, which comprise mixtures of N,N,N-tris(6-isocyanatohexyl)biuret with minor amounts of its higher homologues, and also the cyclic trimers of hexamethylene diisocyanate which meet the aforementioned criteria, as may be obtained in accordance with U.S. Pat. No. 4,324,879, which comprise essentially N,N,N-tris(6-isocyanatohexyl) isocyanurate in a mixture with minor amounts of its higher homologues. Particular preference is given to the mixtures of polyfunctional isocyanates based on hexamethylene diisocyanate which contain uretdione and/or isocyanurate groups and meet the abovementioned criteria, these isocyanates being as formed by catalytic oligomerization of hexamethylene diisocyanate using trialkylphosphines. Particular preference is given to the last-mentioned mixtures with a viscosity at 23° C. of from 50 to 20,000 mPa·s and an NCO functionality of between 2.0 and 5.0.

The aromatic polyfunctional isocyanates, which are likewise suitable in accordance with the invention but are less preferred, comprise in particular "paint polyisocyanates" based on 2,4-diisocyanatotoluene or its technical-grade mixtures with 2,6-diisocyanatotoluene or based on 4,4-diisocyanatodiphenylmethane or its mixtures with its isomers and/or higher homologues. Aromatic paint polyisocyanates of this kind are, for example, the isocyanates containing urethane groups as obtained by reacting excess amounts of 2,4-diisocyanatotoluene with polyhydric alcohols such as trimethylolpropane with possible subsequent distillative removal of the unreacted diisocyanate excess. Further aromatic paint polyisocyanates are, for example, the trimers of the monomeric diisocyanates given as examples, i.e., the corresponding isocyanato isocyanurates, which following their preparation may preferably have been freed, preferably by distillation, from excess monomeric diisocyanates.

Furthermore, the isocyanate component C1 may comprise any desired mixtures of the isocyanates given by way of example.

As a further curing component, use is made of a water-dilutable amino resin C2 especially in a mass fraction of from 5 to 35%, preferably from 10 to 30%, and with particular preference from 15 to 25%, based on the mass of the total curing component. The amino resin C2 is used preferably in partly etherified form. Particularly suitable are partly etherified and partly methylolated melamine resins containing on average from 3 to 5, preferably about 4, methoxymethyl or other alkoxymethyl groups per triazine ring, such as tetramethoxymethylmelamine, and also varieties etherified with butanol or with mixtures of butanol and methanol, and also the corresponding benzoguanamine, caprinoguanamine or acetoguanamine resins. "Methylolated" resins are those where at least one amino hydrogen group is replaced by a N-methylol group formed by addition of formaldehyde to the amino compound. "Etherified" resins are those amino resins where at least a part of the methylol groups are etherified with lower alcohols, preferably aliphatic alcohols of from 1 to 6, especially preferred from 1 to 4 carbon atoms. These resins are also called "alkoxymethyl" melamine (or the respective guanamine) resins. Especially preferred are methoxymethyl, butoxymethyl and isobutoxymethyl resins (those etherified with methanol, n- or iso-butanol, or also mixtures thereof). "Partly etherified" as preferred herein means that from 20 to 80%, preferably from 35 to 65% of all methylol groups are replaced by alkoxymethyl groups in the resin.

The resins A are prepared from the polyhydroxy components A1 and the polycarboxyl components A2 under condensation conditions, i.e., at a temperature of from 80 to 180° C., preferably between 90 and 170° C., preferably in the presence of solvents which form azeotropes with the water formed during the condensation. The condensation is continued until the resins A have acid numbers of from about 25 to about 75 mg/g, at which point the Staudinger Index is from about 13.5 to 18 cm³/g, preferably from 14.5 to 16.5 cm³/g, in each case measured in dimethylformamide as solvent at 20° C. Following at least partial neutralization of the remaining carboxyl groups (with preferably from 50 to 95% of the carboxyl groups, with particular preference from 60 to 85%, being neutralized), the resins A are dispersible in water. During the condensation it may be observed that the initially cloudy reaction mass clarifies and forms a homogenous phase.

The curing agent is added preferably directly prior to the processing of the binder. It is also possible to add the amino resin C2 before the neutralization of the condensate A; the isocyanate C1 should in any case not be added until shortly before processing. The addition of the isocyanate C1 is made preferably with intensive mixing, for example, in high-speed mixers (rotor-stator mixers), or not until during application in known dual-fluid nozzles.

The ready-formulated dispersion may be adapted to the intended application by means of customary additives such as pigments, corrosion inhibitors, levelling agents, antisettling agents, adhesion promoters and defoamers.

For the formulation of clearcoat materials, all that are added are the customary levelling systems, defoamers and, if desired, catalysts which accelerate the curing reaction. The compounds used for this purpose are commonly salts or complex compounds of transition metals such as titanium and cerium or of main-group metals which exist in different valence states, such as antimony, tin or lead.

For the formulation of surfacers, organic or inorganic fillers as well are added to the dispersion, such as carbon black, titanium dioxide, finely divided silica, silicates such as kaolin or talc, chalks, heavy spar or iron oxide pigments; organic fillers which may be used are ground thermoplastics such as polyolefins, polyesters or polyamides; preference is also given to polymers of olefinically unsaturated monomers that are obtainable by emulsion polymerization, including crosslinked polymers in particular.

The surfacer compositions may further comprise the customary solvents, especially water-miscible solvents. These surfacers are normally prepared by grinding the fillers and pigments with a portion of the dispersion and with the addition of dispersing auxiliaries, defoamers and other additives in appropriate dispersing equipment such as a bead mill. The particle size of the fillers and pigments is preferably reduced to less than 15 µm. The remainder of the dispersion and any further additives are added to this preparation in accordance with the target pigment/binder mass ratio of from 0.5:1 to 2.5:1. The mass of the pigments here also includes the mass of the fillers.

The finished formulation may be applied to the substrate by the customary techniques, such as by roller, by spraying or by roll coating. Particular preference is given to spraying application techniques, such as compressed air spraying, airless spraying or what is known as "ESTA high-speed rotation spraying". After a short flash-off time at room temperature or elevated temperature of up to about 80° C., the film is baked at from about 90 to about 130° C. The film thickness after baking is usually from about 15 to about 120 µm, preferably between 25 and 70 µm.

The combination of water-insoluble and hydrophilic curing components in accordance with the invention brings about a markedly improved quality of the baked clearcoat films, which are free from defects such as hazing and pinholing. Despite the fact that in the automotive coating system the surfacer film is coated with at least one further film (solid-color topcoat) or two further films (in the case of metallic paint: pigmented paint film containing color pigment and metallic effect pigment, and a clearcoat film), the markedly improved quality of the surfacer film (reduction in the frequency of defects) also has a substantial influence on the appearance of the finished coating system. The resistance to stone chipping is not adversely affected.

The specific epoxide group content "SEG" is defined as the ratio of the amount of substance of epoxide groups n(EP) and the mass $m_B$ of the substance (and is thus the reciprocal of the so-called "EV value" or "epoxide equivalent weight" (EEW)); the customary unit of measurement is "mmol/kg":

$$SEG = n(EP)/m_B$$

In the reaction of epoxide compounds with primary or secondary amines $R^1R^2$—NH ($R^1$ and $R^2$ being independently selected from alkyl residues preferably of from 1 to 20 carbon atoms, where $R^2$ in the case of a primary amine is H), addition is followed by the formation, with ring opening, of β-hydroxyamines of structure —CH(OH)—CH$_2$—NR$^1$R$^2$. Since one β-hydroxyamine group is formed for each epoxide group reacted, the sum of the amount of substance of β-hydroxyamine groups (calculated from the "EPA value", amount of substance of the β-hydroxyamine groups divided by the mass of the sample) and of that of the unreacted epoxide groups after the reaction is equal to the amount of substance of epoxide groups originally present.

In the examples below, as in the text which precedes them, all figures with the unit "%" are mass fractions (ratio of the mass of the substance in question to the mass of the mixture), unless stated otherwise. "Parts" (abbreviated "pbm") are always mass fractions. Concentration figures in "%" are mass fractions of the dissolved solid in the solution (mass of the dissolved solid, divided by the mass of the solution).

EXAMPLES

1 Preparing the Carboxyl Component A (PCPU1)

675 g of dimethylolpropionic acid, 180 g of ethyl glycol, 543 g of diglycol dimethyl ether and 271 g of methyl isobutyl ketone were weighed out into a reaction vessel with stirring, cooling and heating equipment and were heated to 100° C. At 100° C., 1044 g of tolylene diisocyanate were added dropwise, account being taken of the exothermic reaction, and the temperature was maintained until the mass fraction of free isocyanate groups had fallen to below 0.1%. The batch was subsequently diluted with approximately 540 g of diglycol dimethyl ether and approximately 270 g of methyl isobutyl ketone. This gave a clear resin solution having a viscosity of 500 mPa·s (measured at 23° C. in accordance with DIN EN ISO 3219 on a solution of 46 g of resin in 100 g of solution in diglycol dimethyl ether), a mass fraction of solids of approximately 60% and an acid number of 140 mg/g.

2. Preparing the Carboxyl Component B (PCLM)

300 g of linseed oil were mixed with 100 g of maleic anhydride under a nitrogen atmosphere and the mixture was heated to 200° C. over 4 hours. The temperature of 200° C. was maintained until free maleic anhydride could no longer be detected. After cooling to 85° C., the batch was admixed with a mixture of 30 g of fully deionized (DI) water and 3 g of triethylamine and held until an acid number of 200 mg/g was reached. Subsequently, it was diluted with 85 g of methoxypropoxypropanol. The resulting resin solution had a mass fraction of solids of approximately 80%.

3. Preparing the Hydroxyl Component C (PHEP)

838 g of methoxypropoxypropanol, 1800 g of ®Epikote 1007 (epoxy resin based on bisphenol A, having a weight-average molar mass $M_W$ of 2900 g/mol and a specific epoxide group content "SEC" of approximately 5300 mmol/kg) and 56 g of tall oil fatty acid 150, plus an added esterification catalyst, were held at 170° C. until an acid number of less than 1 mg/g was measured. After the mixture had cooled to 100° C., 84 g of diethanolamine were added and the temperature was maintained until the specific amount of β-hydroxyamine groups ("EPA value", amount of substance of hydroxyamine groups, divided by the mass of the sample) plus the specific amount of unreacted epoxide groups (amount of substance of epoxide groups, divided by the mass of the sample) had fallen to 360 mmol/kg. Following the addition of 50 g of ®Cardura E 10 (glycidyl ester of neodecanoic acid), the temperature was raised to and held at 160° C. This phase was ended when the specific amount of β-hydroxyamine groups ("EPA value") plus that of the unreacted epoxide groups in the sample was 340 mmol/kg.

4 Preparing the Hydroxyl Component D (PHPU1)

In an appropriate reaction vessel, 183 g of dipropylene glycol, 35 g of isononanoic acid, 68.5 g of pentaerythritol, 175 g of isophthalic acid and 0.5 g of dibutyltin dilaurate as catalyst were esterified at 220° C. to an acid number of less than 5 mg/g. At 70° C., the batch was diluted with methyl ethyl ketone to a mass fraction of solids of 65%, and 60 g of tolylene diisocyanate were added. The temperature was held until free NCO groups were no longer detectable.

5 Preparing the Hydroxyl Component F (PHES1)

106 g of tripropylene glycol, 87 g of hexanediol and 104 g of trimellitic anhydride were esterified at 180° C. with 0.2 g of dibutyltin dilaurate as catalyst to an acid number of approximately 20 mg/g. At the end of the reaction, the viscosity of a solution of 55 g of resin in 100 g of solution in butyl glycol, measured in accordance with DIN EN ISO 3219 at 23° C., was approximately 500 mPa·s.

6 Preparing the Hydroxyl Component G (PHES2)

79 g of dipropylene glycol, 87 g of hexanediol and 90 g of trimellitic anhydride were esterified at 180° C. with 0.2 g of dibutyltin dilaurate as catalyst to an acid number of approximately 20 mg/g. At the end of the reaction, the viscosity of a solution of 55 g of resin in 100 g of solution in butyl glycol, measured in accordance with DIN EN ISO 3219 at 23° C., was 500 mPa·s.

7 Preparing the Carboxyl Component H (PCPU2)

270 g of dimethylolpropionic acid, 134 g of dipropylene glycol, 180 g of ethyl glycol, 367 g of diglycol dimethyl ether and 183 g of methyl isobutyl ketone were weighed out into a reaction vessel with stirring, cooling and heating equipment and were heated to 100° C. At 100° C., 696 g of tolylene diisocyanate were added dropwise, account being taken of the exothermic reaction, and the temperature was maintained until the mass fraction of free isocyanate groups had fallen to below 0.1%. The batch was subsequently diluted with approximately 260 g of diglycol dimethyl ether and approximately 130 g of methyl isobutyl ketone. This gave a clear resin solution having a viscosity of 200 mPa·s (measured at 23° C. in accordance with DIN EN ISO 3219 on a solution of 46 g of resin in 100 g of solution in diglycol dimethyl ether), a mass fraction of solids of approximately 60% and an acid number of 95 mg/g.

8 Preparing the Binder 1

65 g of component C (PHEP) and 35 g of component A (PCPU1) were mixed and heated to 150° C. The solvent present was substantially removed prior to the condensation reaction, by distillation under reduced pressure, and at the beginning of the reaction the mass fraction of solid of the reaction mixture was approximately 75%. The temperature was held until an acid number of from 40 to 45 mg/g and a viscosity of 450 mPa·s (measured in accordance with DIN EN ISO 3219 at 23° C. on a solution of 26 g of resin in 100 g of solution in butyl glycol) was reached. The batch was neutralized with dimethylethanolamine and adjusted using DI water to a mass fraction of solid of 30%.

9 Preparing the Binder 2

70 g of component D (PHPU1) and 30 g of component B (PCLM) were mixed. The mixture was condensed at a reaction temperature of 100° C. until an acid number of from 65 to 70 mg/g was reached; the viscosity of a solution of 40 g of resin in 100 g of solution in butyl glycol, measured in accordance with DIN EN ISO 3219 at 23° C., was 450 mPa·s. The batch was subsequently neutralized with dimethylethanolamine and adjusted with fully deionized (DI) water to a mass fraction of solids of 35%.

10 Preparing the Binder 3

137 g of diethylene glycol were mixed with 152 g of trimethylolpropane, 109 g of isophthalic acid, 96 g of adipic acid and 198 g of phthalic anhydride under a nitrogen atmosphere and the mixture was heated to 180° C., water of reaction being removed via a water separator. The temperature was held until the acid number was 60 mg/g. After cooling to 160° C., the batch was diluted with approximately 370 g of butyl glycol. The resulting resin solution had a mass fraction of solids of 60% and a viscosity of approximately 4000 mPa·s, measured in accordance with DIN EN ISO 3219 at 23° C.

11 Preparing the Binder 4
Stage a Fatty Acid Ester

An esterification catalyst was added to 57 g of epoxynovolak ®DEN 431 (Dow Chemical; average functionality 2.2; specific epoxide group content approximately 5700 mmol/kg) and 18.5 g of linseed oil fatty acid, and the mixture was heated to 150° C., account being taken of the exothermic reaction. The temperature was held until the acid number had fallen below 1 mg/g. Subsequently, 44 g of diacetone alcohol and 25 g of epoxy resin ®DER 664 (Dow Chemical; epoxy resin based on bisphenol A; type 4; specific epoxide group content approximately 1100 mmol/kg) were added. Following thorough homogenization, the batch was cooled to 50° C.

Stage b Phosphoric Ester

A mixture of 10 g of phosphoric acid (75% strength solution in water) and 25 g of diacetone alcohol was heated to 50° C. Subsequently, the fatty acid ester from stage a was added in portions at a rate such that the exothermic reaction occurring allowed the temperature to be maintained. Stirring was continued until the specific epoxide group content had fallen below 0.1 mmol/g. The batch was adjusted using diacetone alcohol to a mass fraction of solids of 60%; the viscosity, measured in accordance with DIN EN ISO 3219 at 23° C. in a solution of 45 g of resin in 100 g of a solution in methoxypropoxypropanol, was 500 mPa·s.

12 Preparing the Binder 5

75 g of component G (PHES2) and 25 g of component H (PCPU2) were mixed and heated to 150° C. The solvent present was substantially removed, by distillation under reduced pressure. The temperature of 150° C. was held until an acid number of from 35 to 40 mg/g and a viscosity of 600 mPa.s (measured in accordance with DIN EN ISO 3219 at 23° C. on a solution of 45 g of resin in 100 g of a solution in butyl glycol) was reached. After cooling to 95° C., the batch was neutralized with dimethylethanolamine and adjusted using DI water to a mass fraction of solid of 30%.

13 Preparing the Binder 6

75 g of component F (PHES1) and 25 g of component H (PCPU2) were mixed and heated to 150° C. The solvent present was substantially removed, by distillation under reduced pressure. The temperature of 150° C. was held until an acid number of from 35 to 40 mg/g and a viscosity of 600 mPa·s (measured in accordance with DIN EN ISO 3219 at 23° C. on a solution of 45 g of resin in 100 g of a solution in butyl glycol) was reached. After cooling to 95° C., the batch was neutralized with dimethylethanolamine and adjusted using DI water to a mass fraction of solid of 30%.

14 Preparing Clearcoat Materials

The clearcoat materials 1 to 12 were prepared in accordance with the formulas summarized in Table 1 (masses of the respective components used, in g). The substances used were as follows:

®Maprenal VMF 3921: partially etherified highly reactive melamine resin (on average 4 methoxymethyl groups per molecule of melamine) from Vianova Resins GmbH & Co. KG ®Bayhydur 3100: hydrophilically modified (water-dispersible) polyfunctional isocyanate from Bayer AG based on hexamethylene diisocyanate having a mass fraction of isocyanate groups of approximately 17.4%

®Desmodur N 3600: aliphatic polyfunctional isocyanate from Bayer AG based on hexamethylene diisocyanate, solution of 90 g of the isocyanate in 100 g of solution, the solvent is a mixture of butyl acetate and "Solvent Naphtha 100" in a mass ratio of 1:1

®Basonat P LR 8878: solvent-free hydrophilic polyfunctional aliphatic isocyanate from BASF AG based on hexamethylene diisocyanate having a mass fraction of isocyanate groups of from 17 to 18%

®Proglyde DMM: dipropylene glycol dimethyl ether

Crosslinking catalyst: zirconium complex compound ®K-Kat XC 6212 (King Industries)

®Additol XW 392: curing accelerator based on organic phosphates (Vianova Resins GmbH & Co. KG)

The clearcoat materials thus prepared were applied to clean glass plates using a 200 μm coating bar. After a flash-off time of 15 minutes, the films were subjected to forced drying at 90° C. for 20 minutes.

TABLE 1

| | Clearcoat Examples | | | | | | | |
|---|---|---|---|---|---|---|---|---|
| Coating material (CM) | CM1 | CM2 | CM3 | CM4 | CM5 | CM6 | CM7 | CM8 |
| Binder 3 (40% in water) | 50 | 50 | 50 | 50 | 50 | 50 | 50 | 50 |
| ® Maprenal VMF 3921 | 5.9 | 5.9 | 5.9 | 5.9 | — | 5.9 | 5.9 | 5.9 |
| ® Bayhydur 3100 | 25 | | | | | | | |
| ® Desmodur N 3600 | | | 25 | 25 | 25 | | | |
| ® Basonat P LR 8878 | | 25 | | | | | | |
| ® Proglyde DMM | 6.25 | 6.25 | 6.25 | 6.25 | 6.25 | | | |
| Deionized water | 25 | 25 | 11 | 16 | 17 | 15 | 15 | 15 |
| Cross-linking catalyst | | | | 0.2 | 0.2 | | | 0.2 |
| ® Additol XW 392 | | | | | | | 1.25 | |
| Appearance of the cured coating film | Clear, no film defects | Clear, no film defects | Clear, no film defects | Clear, no film defects | Cloudy, pinholes, film defects | Clear, no film defects | Clear, no film defects | Clear, no film defects |
| Pendulum hardness[1] in s | 18 | 21 | 18 | 93 | 68 | 21 | 18 | 16 |
| Pendulum hardness[24] in s | 95 | 91 | 176 | 176 | 92 | 24 | 21 | 20 |

Pendulum hardness measured in accordance with König (DIN 53 157) following forced drying (20 minutes at 90° C., and storage for 1 ("pendulum hardness¹") or 24 ("pendulum hardness²⁴") hours under standard conditions

TABLE 1

Clearcoat Examples (continued)

|  | CM9 | CM10 | CM11 | CM12 |
|---|---|---|---|---|
| Binder 4 (35% in water) | 46.5 | 46.5 | 46.5 | 46.5 |
| ®Maprenal VMF 3921 | 4.7 | 4.7 | 4.7 | — |
| ®Desmodur N 3600 | 8 | — | — | 8 |
| ®Basonat P LR 8878 | — | 8 | — | — |
| N-methyl-pyrrolidone | 2 | 2 | — | 2 |
| Deionized water | 18.5 | 20.5 | 18.5 | 18.5 |
| Crosslinking catalyst | 0.16 | 0.16 | — | 0.16 |
| Additol XW 392 | 1 | 1 | 1 | 1 |
| Appearance of the cured coating film | Clear, no film defects | Clear, no film defects | Clear, no film defects | Cloudy, pinholes, film defects |
| Pendulum hardness¹ in s | 136 | 59 | 20 | 91 |
| Pendulum hardness²⁴ in s | 153 | 70 | 28 | 112 |

Result:

The clearcoat materials which are cured only with melamine resin, even in combination with different catalysts (coating materials 6,7,8, and 11) do not give sufficiently high film hardnesses after 20 minutes of curing at 90° C. and are therefore unsuitable for use in practice.

Crosslinking with unblocked isocyanate curing agents only (Examples 5 and 12) leads to better film hardness; owing to the incompatibility between binder and isocyanate, however, there are film defects, which likewise rule out use in practice.

Defect-free coating films, however, were obtained with the combination of melamine resin and hydrophilic isocyanate curing agent (Examples 1, 2 and 10); in these cases, however, the degree of hardness achieved was still inadequate.

All these examples are included for comparison, and to illustrate the advantage brought about by the present invention.

Only the combination of a binder of the invention with a melamine resin and unblocked isocyanate leads to the desired defect-free films possessing high pendulum hardnesses (Examples 3, 4 and 9). The presence of a crosslinking catalyst results in high hardness even after a short period of storage; without a catalyst, the hardness develops only after about 24 h of storage under standard conditions, following the forced drying (20 minutes at 90° C.) which preceded this storage in all cases.

15 Preparation of Surfacer Materials

Using the formulations stated in Table 2 (masses of the relevant components in grams), aqueous surfacer materials were prepared in accordance with the procedure known to the skilled worker. These coating materials were applied to cleaned glass plates using a 200 μm coating bar. Coating materials 13 and 14 were flashed off for 15 minutes and then subjected to forced drying at 90° C. for 20 minutes.

TABLE 2

Surfacer materials

|  | Coating material 13 | Coating material 14 | Comparison: Ex. 4 from EP-B 0 594 685 |
|---|---|---|---|
| Binder 4 (35% in water) | 50 |  |  |
| Binder 5 (35% in water) |  | 50 |  |
| Wetting agent | 0.3 | 0.3 |  |
| Titanium dioxide | 15 | 11.7 |  |
| Fillers | 15 | 18.3 |  |
| ®Additol VXW 4971 | 0.3 | 0.3 |  |
| Deionized water | 18.5 | 18.5 |  |
| Methoxypropoxy-propanol | 1.5 | 1.5 |  |
| ®Mapranal VMF 3921 | 5.1 | 5.1 |  |
| ®Desmodur N 3600 | 8.55 | 6.85 |  |
| ®Basonat P LR 8878 |  | 1.7 |  |
| N-methyl-pyrrolidone | 1.45 | 1.45 |  |
| Crosslinking catalyst | 0.17 | 0.17 |  |
| ®Additol XW 392 | 1.05 | 1.05 |  |
| Appearance of the cured coating film | defect-free | defect-free |  |
| Dry film thickness in μm | 42 | 42 | 40 |
| Pendulum hardness¹ in s | 98 | 51 | 60 |
| Pendulum hardness²⁴ in s | 106 | 95 | 74 |

®Additol VXW4971: levelling and wetting additive (Vianova Resins GmbH & Co. KG)

The comparative example comprises an aqueous surfacer in accordance with EP-A 0 594 685, Example 4). This was applied and flashed off as for coating materials 13 and 14 but then was baked at 165° C. for 20 minutes.

Test Panels for Stone-Chip Test:

Test system: Bonder 26 60 OC as substrate, 25 μm of a standard electrocoat primer, 35 μm of aqueous surfacer based on coating material 13, 14 or comparison of table 2, 40 μm of standard commercial acrylic-melamine topcoat

| Baking conditions for electrocoat primer: | 30 minutes at 165° C. |
|---|---|
| Baking conditions for surfacers: | Coating materials 13 and 14: 20 minutes at 90° C., Comparison: 20 minutes at 165° C. |
| Baking conditions for topcoat: | 30 minutes at 140° C. |

The metal test panels so painted and prepared were stored under standard conditions for 24 hours and then subjected to a stone-chip test in accordance with the VDA [German Automakers' Association] Standard 621-487 (2 passes each with 0.5 kg of angular shot material, pressure: 0.1 MPa (=1 bar))

| Test panel 1: | Electrocoat primer, surfacer based on coating material 13, topcoat |
|---|---|
| Test panel 2: | Electrocoat primer, surfacer based on coating material 14, topcoat |
| Test panel 3: | Electrocoat primer, comparative surfacer, topcoat |

Result:

Following forced drying (20 minutes at 90° C.), the two surfaces crosslinked with unblocked isocyanate and melamine resin give defect-free coatings whose film hardness is higher in both cases than that of the aqueous baking surfacer (state of the art), which was baked at 165° C. for 20 minutes. Despite the "equalizing" effect of the topcoat film, the quality of the surface in the case of test panels 1 and 2 (in accordance with the invention) was better than in the case of the comparative surfacer which was baked at a higher temperature.

The stone-chip ratings listed in Table 3 show that in the coating system described the results achieved with the surfacers of the invention following forced drying (20 minutes at 90° C.) were approximately equal to those obtained with the state of the art surfacer (baked at 165° C. for 20 minutes).

TABLE 3

| | Stone-chip test | | |
|---|---|---|---|
| | Test panel 1 | Test panel 2 | Test panel 3 |
| Stone chip rating | 1–2 | 1 | 0–1 |

Evaluation as per the Standard:
Topcoat adhesion (0 = no flaking of the topcoat from the surfacer; 10 = no adhesion between topcoat and surfacer)

What is claimed is:

1. A coating composition comprising
   a condensation product A of a carboxyl group-containing resin A1 and a hydroxyl group-containing resin A2, and
   a curing agent C which becomes active already at temperatures below 120° C., wherein said curing agent comprises a mixture of a water-insoluble unblocked isocyanate C1 and a hydrophilic partially etherified amino resin C2.

2. The coating composition as claimed in claim 1, wherein a carboxyl group-containing resin A1 is replaced by a resin selected from resins Ae, namely epoxy resins modified with phosphoric acid or phosphonic acids and reaction products of epoxy resins with fatty acids that are modified with phosphoric acid or phosphonic acids, and resins Ap, namely polyesters containing excess acid groups.

3. The coating composition as claimed in claim 1 or 2, wherein the component A has an acid number of from 25 to 75 mg/g.

4. The coating composition as claimed in claim 1 or 2, wherein the component A1 has an acid number of from 100 to 230 mg/g.

5. The coating composition as claimed in claim 1 or 2, wherein the component A2 has an acid number of from 50 to 500 mg/g.

6. The coating composition as claimed in claim 1 or 2, wherein the curing agent C is a mixture of mass fractions of from 65 to 95% of a water-insoluble unblocked polyfunctional isocyanate C1 and from 5 to 35% of a water-dilutable partially etherified and partially methylolated amino resin C2.

7. The coating composition as claimed in claim 1 or 2, wherein the curing agent C2 is a partially etherified and partially methylolated amino resin containing on average from 3 to 5 alkoxymethyl groups per triazine ring.

8. The coating composition as claimed in claim 1 or 2, wherein the curing agent C1 has a viscosity at 23° C. of from 50 to 20,000 mPa·s.

9. The coating composition as claimed in claim 1 or 2, wherein from 60 to 95% of the carboxyl groups of the resins A have been neutralized.

10. A process for preparing a coating composition as claimed in claim 1 or 2, which comprises preparing from the carboxyl group-containing resins A1 and/or Ae and from the hydroxyl group-containing resins A2 under polycondensation conditions, a resin A whose remaining carboxyl groups are neutralized to the extent of from 60 to 95% dispersing the neutralized resin A in water, and mixing the aqueous dispersion with the curing agent C prior to application.

11. A method of use of the coating composition as claimed in claim 1 or 2 to produce surfacer films on metallic substrates, comprising the steps of grinding organic or inorganic fillers with a portion of the dispersion, then adding dispersing auxilliaries, defoamers, and other additives, and then applying the finished formulation to the substrate by rolling, spraying, or roll coating, flashing-off at a temperature from room temperature to about 80° C., and baking the film at a temperature from about 90 to about 130° C.

* * * * *